United States Patent [19]

Cook

[11] Patent Number: 5,078,502
[45] Date of Patent: Jan. 7, 1992

[54] COMPACT AFOCAL REIMAGING AND IMAGE DEROTATION DEVICE

[75] Inventor: Lacy G. Cook, El Segundo, Calif.

[73] Assignee: Hughes Aircraft Company, Los Angeles, Calif.

[21] Appl. No.: 563,124

[22] Filed: Aug. 6, 1990

[51] Int. Cl.⁵ .................. G02B 17/06; G02B 27/30; G02B 27/00
[52] U.S. Cl. ................... 359/366; 359/401; 359/859; 359/641
[58] Field of Search ............ 350/505, 620, 622, 539

[56] References Cited

U.S. PATENT DOCUMENTS

| | | | |
|---|---|---|---|
| 3,190,171 | 6/1965 | Reed | 350/620 |
| 3,748,015 | 7/1973 | Offner | 350/505 |
| 4,632,521 | 12/1986 | Korsch | 350/505 |
| 4,804,258 | 2/1989 | Kebo | 350/505 |

Primary Examiner—Jon W. Henry
Attorney, Agent, or Firm—W. J. Streeter; G. S. Grunebach; W. K. Denson-Low

[57] ABSTRACT

The present optical system provides an all-reflective afocal reimaging system. A reflective system receives, by means of an entrance aperture, and reflects radiation or light through the system such that the radiation or light is imaged and recollimated as it is reflected through the system. The radiation or light exits at an exit aperture which is an image of the entrance aperture. High quality images of both the collimated scene and reimaged aperture are formed by the optical system. Embodiments are shown by which the optical system can be used as an optical derotation device by the inclusion of two planar mirrors located near the entrance and exit apertures.

16 Claims, 1 Drawing Sheet

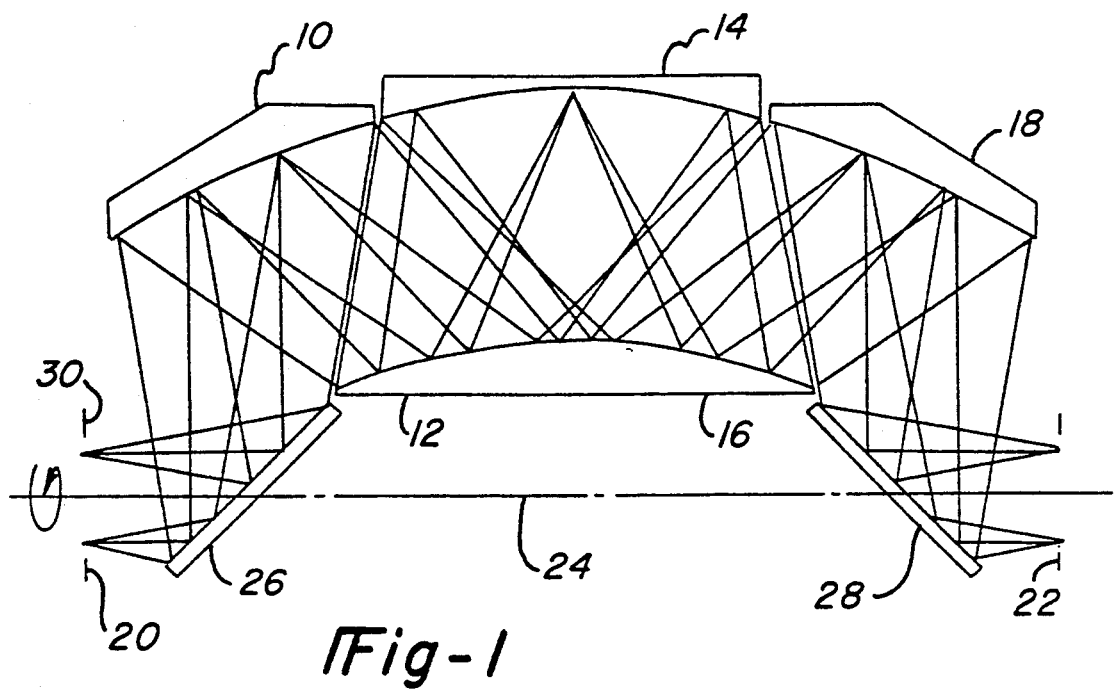
_Fig-1_
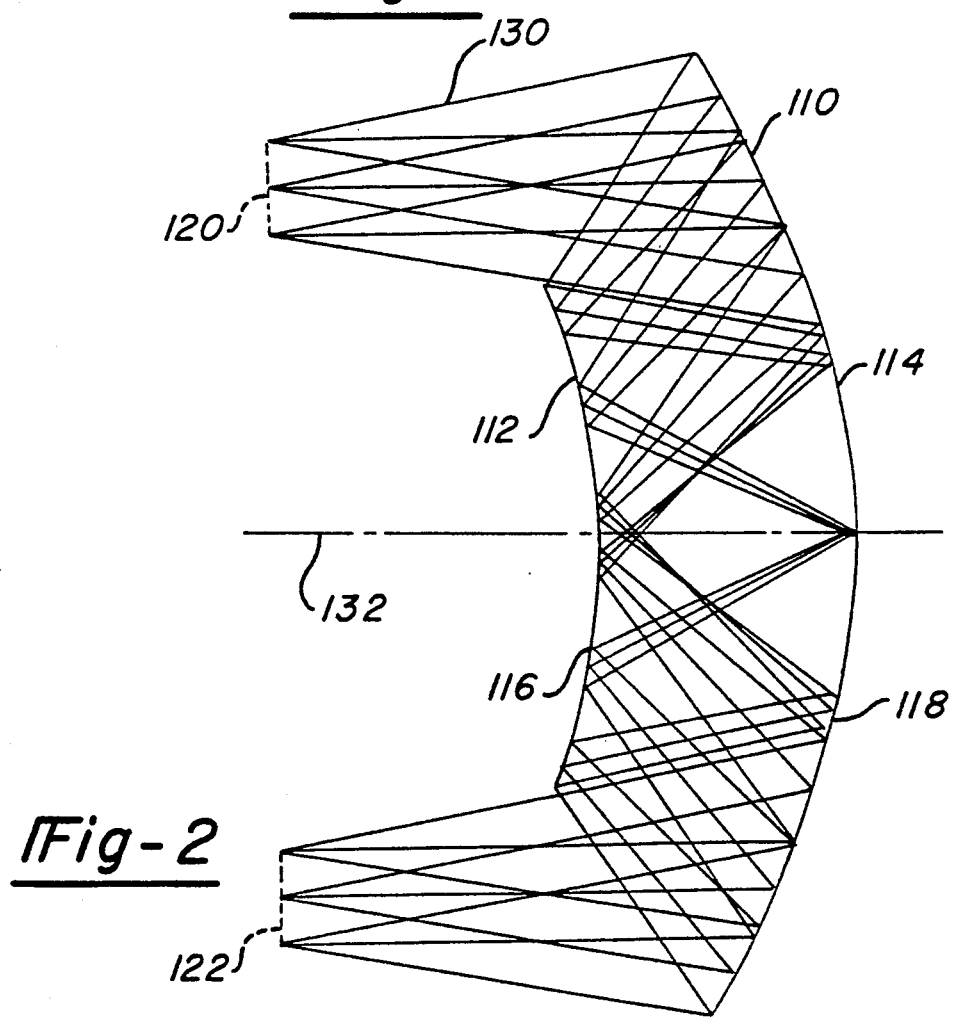
_Fig-2_

COMPACT AFOCAL REIMAGING AND IMAGE DEROTATION DEVICE

BACKGROUND

1. Technical Field

This invention relates to all-reflective optical systems and, more particularly, to an afocal reimaging and image derotating all-reflective optical system.

2. Discussion

Optical systems located on stabilized gimbals for pointing purposes, which provide imagery to detector arrays located off gimbal, require image derotation devices to maintain constant image orientation as the gimbal is articulated. Relevant art devices utilized in this area ordinarily separate the reimaging and derotation functions into two optical systems. One, for reimaging, utilizing lenses and/or powered mirrors and another for derotating, utilizing prisms and/or planar mirrors.

Relevant art derotation devices utilizing prisms are well known. Some of the known prisms which are utilized for derotation are Pechan, Reversion, Harting-Dove, and Abbe Type A and B. Also, a known reflective derotation device is a K mirror arrangement which utilizes three planar mirrors arranged in a K type configuration. These devices can be very large, heavy, require long path lengths, and do not reimage the viewed scene.

Likewise, known in the field are various afocal reimaging optical systems of refractive and reflective construction. While these devices provide satisfactory imaging or reimaging, none function well as a derotation device providing useable scene and pupil image quality.

SUMMARY OF THE INVENTION

According to the teachings of the present invention, an optical system is provided which provides reimaging and derotation of collimated radiation directed at or into the system. The present invention provides an all-reflective reimaging and derotating optical system which eliminates the disadvantages of prior refractive and reflective optical systems. The present invention is capable of being manufactured in a small compact size. The small compact size enables the device to be mounted on or in a stabilized gimbal to provide reimaging and derotation of collimated radiation received by the device. The present invention provides an afocal unity magnification relay with excellent scene and pupil imagery. Also the optical system provides an image derotation device when rotated about an axis of rotation.

In the preferred embodiment, the all-reflective reimaging and derotating system is comprised of the following. An odd number of powered mirror surfaces positioned to receive and reflect collimated radiation of an image of an object being viewed. The radiation is directed into the odd number of powered mirror surfaces through an entrance aperture and is reimaged and recollimated by the odd number of powered mirror surfaces. Also, the entrance aperture is reimaged at an exit aperture by the odd number of powered mirror surfaces. Additionally, image derotation is obtained by the incorporation of two planar fold mirrors located near the entrance and exit apertures and by rotation of the resulting mirror assembly about the axis of rotation thus created.

BRIEF DESCRIPTION OF THE DRAWINGS

The various advantages of the present invention will become apparent to those skilled in the art after a study of the following specification and by reference to the drawings in which:

FIG. 1 is a schematic diagram of an apparatus in accordance with the teaching of the present invention which is most suited to image derotation.

FIG. 2 is a schematic diagram of an apparatus in accordance with the teaching of the present invention.

DESCRIPTION OF THE PREFERRED EMBODIMENT

Referring to FIG. 1, an all-reflective reimaging and derotating optical system is shown including primary 10, secondary 12, tertiary 14, quaternary 16 and quintary 18 mirrors. The system includes an entrance aperture 20 and an exit aperture 22 concentrically positioned on an axis of rotation 24. A pair of planar mirrors 26 and 28 to fold the light or radiation as it enters and exits the system are positioned to be aligned with the entrance and exit apertures 20 and 22, respectively.

The primary mirror 10 is a positive power mirror and is positioned to receive light or radiation from the planar mirror 26. The surface of the primary mirror 10 may be of a spheric, conic, or higher order aspheric mirror surface.

The secondary mirror 12 is a negative power mirror and is positioned to receive light or radiation from the primary mirror 10 and to reflect it to the tertiary mirror 14. The surface of the secondary mirror 12 may have a spheric, conic, or higher order aspheric mirror surface. The primary mirror 10 and secondary mirror 12 form a Cassegrain-like pair for scene imaging.

The tertiary mirror 14 is a positive power mirror and is positioned to receive light or radiation from the secondary mirror 12. The tertiary mirror 14 also reflects the light or radiation to the quaternary mirror 16. The surface of the tertiary mirror 14 may be of a spheric, conic, or higher order aspheric mirror surface. The tertiary mirror 14 is generally a field mirror concerned with aperture or pupil imaging.

The quaternary mirror 16 is a negative power mirror and is positioned to receive light or radiation from the tertiary mirror 14 and to reflect it to the quintary mirror 18. The surface of the quaternary mirror 16 may be of a spheric, conic, or a higher order aspheric mirror surface and its optical surface may be substantially similar or identical to that of the secondary mirror 12.

The quintary mirror 18 is a positive power mirror and is positioned to receive light or radiation from the quaternary mirror 16 and to reflect it to the planar mirror 28. The surface of the quintary mirror 18 may be of a spheric, conic, or other higher order aspheric mirror surface and its optical surface may be substantially similar or identical to that of the primary mirror 10. The quintary and quaternary mirrors form a Cassegrain-like pair to collimate the radiation or light reflected from the tertiary mirror 14.

Ordinarily, the primary 10, secondary 12, tertiary 14, quaternary 16 and quintary 18 mirror surfaces would be precision diamond machined out of aluminum and coupled together. The primary 10, tertiary 14 and quintary 18 mirror surfaces may be machined into a single aluminum plate. The primary 10 and the quintary 18 may have substantially similar or identical surface configurations. The secondary 12 and quaternary 16 mirrors may have substantially similar or identical surfaces or be a continuous surface on a single plate having machined mirror surfaces on the same mirror. The secondary 12 and quaternary 16 mirrors and the planar fold mirrors 26 and 28 are generally separate structures but share a common support.

The system can be rotated about the axis 24 along the entrance and exit apertures 20 and 22. Referring to FIG. 1, the system would rotate out of the page as indicated by the arrow. The scene or image which is generated by the system would rotate at twice the rate of rotation as that of the system.

Generally, the system functions as follows. Radiation or light is directed into the entrance aperture 20 and is designated by ray traces which are designated with the reference numeral 30. The rays 30 are directed to the planar mirror 26 where they are folded and reflected to the primary mirror 10. From the primary mirror 10, the rays 30 are reflected to the secondary mirror 12. The rays 30 are reflected from the secondary mirror 12 to the tertiary mirror 14. As the rays 30 move from the primary and secondary mirrors 10 and 12, the viewed image is focused generally onto the tertiary mirror 14. The image on the tertiary mirror 14 is reflected from the tertiary mirror 14 to the quaternary mirror 16. The rays 30 then bounce from the quaternary mirror 16 to the quintary mirror 18. The rays 30 are reflected from the quintary mirror 18 to the planar fold mirror 28. The quaternary and quintary mirrors recollimate the rays 30 as they are reflected from the tertiary mirror 14. Mirror 28 reflects the rays 30 out through the exit aperture 22 which is an image of the entrance aperture 20 as formed by the various mirror surfaces within the system. At the entrance aperture 20 and at exit aperture 22, the system includes an entrance aperture 120 and an exit aperture 122 positioned symmetrically with respect to the optical axis 132.

The primary 110, secondary 112, tertiary 114, quaternary 116 and quintary 118 mirrors are substantially the same as those previously described. However, the system is not intended to rotate and thus serves as a reimaging optical system. The operation of the system is as follows.

Radiation or light is directed into the entrance aperture 120 and is designated by ray traces which are designated with the reference numeral 130. The rays 130 are directed to the primary mirror 110. From the primary mirror 110, the rays 130 are reflected to the secondary mirror 112 The rays 130 are reflected from the secondary mirror 112 to the tertiary mirror 114. As the rays 130 move from the primary and secondary mirrors 110 and 112, the viewed image is focused generally onto the tertiary mirror 114. The image on the tertiary mirror 114 is reflected from the tertiary mirror 114 to the quaternary mirror 116. The rays 130 then bounce from the quaternary mirror 116 to the quintary mirror 118. The rays 130 are reflected from the quintary mirror 118 to the exit aperture 122. The quaternary and quintary mirrors recollimate the rays 130 as they are reflected from the tertiary mirror 114. Quintary mirror 118 reflects the rays 130 out through the exit aperture 122 which is an image of the entrance aperture 120 as formed by the various mirror surfaces within the system. At the entrance aperture 120 and at exit aperture 122, the system has a generally circular field of view on the order of 20° with excellent scene and pupil image quality.

A specific prescription for the system in accordance with the present invention is as follows:

TABLE 1

OPTICAL PRESCRIPTION OF A SPECIFIC EMBODIMENT OF THE OPTICAL SYSTEM OF THE PRESENT INVENTION

| # | Description | Radius | Conic Constant | AD | AE | AF | AG | Thickness |
|---|---|---|---|---|---|---|---|---|
| 20 | Entrance* Aperture | ∞ | — | — | — | — | — | 4.000 |
| 10 | Primary Mirror | −4.947 | −0.80176 | −1.5768E-5 | 2.0463E-6 | −5.6036E-7 | 1.8536E-8 | −1.649 |
| 12 | Secondary Mirror | −3.229 | −4.4126 | −2.5718E-3 | −1.0570E-3 | 1.9151E-4 | −3.9328E-5 | 1.686 |
| 14 | Tertiary Mirror | −4.110 | −0.68536 | −3.2719E-4 | 8.0543E-4 | −1.1491E-3 | 2.4936E-4 | −1.686 |
| 16 | Quaternary Mirror | −3.229 | −4.4126 | −2.5718E-3 | −1.0570E-3 | 1.9151E-4 | −3.9328E-5 | 1.649 |
| 18 | Quintary Mirror | −4.947 | −0.80176 | −1.5768E-5 | 2.0463E-6 | −5.6036E-7 | 1.8536E-8 | −4.000 |
| 22 | Exit* Aperture | ∞ | — | — | — | — | — | — |

*Entrance and exit aperture diameters are 0.325 Lateral offsets are +2.40 and −12.40, respectively, to the aperture center
Device field of view is ±10.0 degrees
All mirrors have a common system optical axis such as 132 in FIG. 2

$$\text{Surface SAG} = \frac{c\rho^2}{1 + \sqrt{1 - (k+1)c^2\rho^2}} + AD\rho^4 + AE\rho^6 + AF\rho^8 + AG\rho^{10}$$

$c = 1/\text{Radius}$
$K = \text{Conic Constant}$
$\rho^2 = x^2 + y^2$ has a generally circular field of view on the order of 20° with excellent scene and pupil image quality. Derotation is obtained by rotation of the system about the axis 24 of the system.

Referring to FIG. 2, an all-reflective reimaging optical system is shown which is substantially similar to FIG. 1 absent planar mirrors 26 and 28. The system includes a primary 110, secondary 112, tertiary 114, quaternary 116 and quintary 118 mirrors. The system The present invention has application in optical sensing systems which employ pointing gimbals. The device may be utilized where image relaying and image derotation is needed because a portion of the optics are on a pointing gimbal and a portion are off gimbal. Also, the present invention provides for maintaining a collimated or afocal interface between two optical systems. This is due to the fact that the present invention does not use up the optical path in either one of the systems providing collimated or afocal interface at both of its ends.

It should be understood that while this invention has been described in connection with a particular example hereof, that various modifications, alterations and variations of the preferred embodiments can be made after having the benefit of a study of the specification, drawings and subjoined claims.

What is claimed is:

1. An all-reflective reimaging system comprising:
an entrance aperture for receiving radiation of an image of an object being viewed;
collimated radiation for reflecting through said system; and
first reflecting means for reflecting said collimated radiation through the system such that said collimated radiation is imaged and recollimated as it is reflected through said system to exit at an exit aperture which is an image of said entrance aperture formed by said first reflecting means and second reflecting means for reflecting the collimated radiation into said first reflecting means and for receiving the collimated radiation from said first reflecting means and reflecting the collimated radiation to said exit aperture.

2. The system according to claim 1 wherein said reflecting means includes one or more powered mirrors.

3. The system according to claim 2 wherein said reflecting means includes an odd number of mirrors.

4. The system according to claim 1 wherein said second reflecting means includes a pair of flat mirrors, one substantially at the entrance aperture for reflecting the collimated radiation into said reflecting means and one substantially at the exit aperture for receiving the collimated radiation from said reflecting means and reflecting the collimated radiation to said exit aperture.

5. The system according to claim 4 wherein said entrance aperture and exit aperture are concentric about an axis.

6. The system according to claim 5 wherein said system includes means for rotating said system about said axis causing the collimated image of said object to rotate at twice the said angular rate of rotation to derotate the image.

7. An all-reflective reimaging system comprising:
an entrance aperture for receiving radiation of an image of an object being viewed;
collimated radiation for reflecting through said system; and
an odd number of powered mirrors positioned for receiving and reflecting said collimated radiation such that said collimated radiation is imaged and recollimated as it is reflected by said odd number of powered mirrors to an exit aperture which is an image of said entrance aperture as formed by said odd number of powered mirrors and a pair of flat planar fold mirrors, one substantially at the entrance aperture for reflecting the collimated radiation into said odd number of powered mirrors and one substantially at the exit aperture for receiving the collimated radiation from said odd number of powered mirrors and reflecting the collimated radiation to said exit aperture.

8. The system according to claim 7 wherein said system includes at least five powered mirrors three positive and two negative.

9. The system according to claim 7 wherein said entrance aperture and exit aperture are concentric about an axis.

10. The system according to claim 5 wherein said system includes means for rotating said system about said axis causing the collimated image of said object to rotate at twice the said angular rate of rotation to derotate the image.

11. An all-reflective reimaging system comprising:
an entrance aperture for receiving radiation of an image of an object being viewed;
collimated radiation for reflecting through said system;
a primary mirror surface adapted to receive an reflect collimated radiation of the image of the object being viewed;
a secondary mirror surface positioned to receive radiation from said primary mirror surface and to reflect the radiation;
a tertiary mirror surface positioned to recieve radiation from said secondary mirror surface and to reflect said radiation, said primary and secondary mirror surfaces focusing an image of the viewed object substantially on said tertiary mirror;
a quaternary mirror surface positioned to receive radiation from said tertiary mirror surface and to reflect said radiation; and
a quintary mirror surface positioned to receive radiation from said quaternary mirror surface and to reflect said radiation, said quaternary and quintary mirror surfaces recollimating said radiation upon reflection from said tertiary mirror to an exit aperture which is an image of said entrance aperture as formed by said mirrors in said system.

12. The system according to claim 11 wherein said primary, tertiary and quintary mirror surfaces are positive powered mirror surfaces, said surfaces of which are spherical, conic, or higher order general aspheric with said primary and said quintary mirrors having substantially similar or identical optical surfaces.

13. The system according to claim 11 wherein said secondary and quaternary mirror surfaces are negative powered mirror surfaces, said surfaces of which are spherical, conic, or higher order general aspheric with said secondary and quaternary mirrors having substantially similar or identical optical surfaces.

14. The system according to claim 11 wherein said system further includes a pair of flat planar fold mirrors, one substantially at the entrance aperture for reflecting the collimated radiation into said primary mirror surface and one substantially at the exit aperture for receiving the collimated radiation from said quintary mirror surface and reflecting the collimated radiation to said exit aperture.

15. The system according to claim 14 wherein said entrance aperture and exit aperture are concentric about an axis.

16. The system according to claim 15 wherein said system includes means for rotating said system about said axis causing the collimated image of said object to rotate at twice the said angular rate of rotation to derotate the image.

* * * * *

UNITED STATES PATENT AND TRADEMARK OFFICE
CERTIFICATE OF CORRECTION

PATENT NO. : 5,078,502
DATED : January 7, 1992
INVENTOR(S) : LACY G. COOK It is certified that error appears in the above-identified patent and that said Letters Patent is hereby corrected as shown below:

Table 1, Column 4, Line 52  delete "-12.40", insert -- -2.40--.

Signed and Sealed this

Fourth Day of May, 1993

*Attest:*

MICHAEL K. KIRK

*Attesting Officer*  Acting Commissioner of Patents and Trademarks